(12) United States Patent
Segev et al.

(10) Patent No.: US 11,768,606 B2
(45) Date of Patent: Sep. 26, 2023

(54) MAXIMIZING PERFORMANCE THROUGH TRAFFIC BALANCING

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 112 days.

(21) Appl. No.: 17/562,703

(22) Filed: Dec. 27, 2021

(65) Prior Publication Data
US 2023/0205422 A1 Jun. 29, 2023

(51) Int. Cl.
G06F 3/06 (2006.01)
G06F 13/14 (2006.01)

(52) U.S. Cl.
CPC .......... G06F 3/0613 (2013.01); G06F 3/0655 (2013.01); G06F 3/0679 (2013.01)

(58) Field of Classification Search
CPC ...... G06F 3/0613; G06F 3/061; G06F 3/0655; G06F 3/0659; G06F 13/14; G06F 13/16; G06F 13/1642; G06F 13/1668; H04L 67/1008; H04L 67/1012; H04L 67/1014; H04L 67/1029; H04L 67/1031; H04L 67/1036
USPC .................. 710/5, 6; 711/147, 157; 718/105
See application file for complete search history.

(56) References Cited

U.S. PATENT DOCUMENTS

| | | | |
|---|---|---|---|
| 6,715,006 B1 * | 3/2004 | Hotta | G06F 3/0659 710/45 |
| 9,940,980 B2 | 4/2018 | Lee et al. | |
| 10,108,565 B2 | 10/2018 | Olcay et al. | |
| 10,275,378 B2 | 4/2019 | Benisty | |
| 10,353,587 B2 * | 7/2019 | Jeong | G06F 3/0659 |
| 10,466,904 B2 * | 11/2019 | Benisty | G06F 13/1642 |
| 10,740,000 B2 | 8/2020 | Benisty | |
| 2018/0052634 A1 * | 2/2018 | Ngu | G06F 3/0611 |

(Continued)

FOREIGN PATENT DOCUMENTS

WO 20210216783 A1 10/2021

OTHER PUBLICATIONS

International Search Report and Written Opinion for International Application No. PCT/US2022/029543 dated Oct. 21, 2022.

*Primary Examiner* — Ilwoo Park
(74) *Attorney, Agent, or Firm* — PATTERSON + SHERIDAN, LLP; Steven H. VerSteeg (57) ABSTRACT

A data storage device includes a memory device and a controller coupled to the memory device. The controller is configured to receive a plurality of fetch requests, determine a first number of requests, second number of requests, and a third number of requests of the plurality of fetch requests, and balance an execution of the first number of requests, the second number of requests, and the third number of requests so that a first ratio of the data requests to the PRP requests and a second ratio of the data requests to the HMB requests is about 1. The plurality of fetch requests includes PRP requests, HMB requests, and data requests. The first number of requests corresponds to a number of the PRP requests. The second number of requests corresponds to a number of the HMB requests. The third number of requests corresponds to a number of the data requests.

20 Claims, 5 Drawing Sheets

(56) References Cited

U.S. PATENT DOCUMENTS

| | | |
|---|---|---|
| 2018/0321945 A1 | 11/2018 | Benisty |
| 2019/0138220 A1 | 5/2019 | Hahn et al. |
| 2019/0155545 A1 | 5/2019 | Kim et al. |
| 2021/0374079 A1 | 12/2021 | Shin et al. |

* cited by examiner

```
// Initialize variables
CMD_lack = required_write_cmd_pool - (Pre_fetched_CMD + in_flight_CMD);
PRP_lack = Required_PRP_pool - (Pre_fetched_PRP + in_flight_PRP);
HMB_lack = Required_HMB_pool - (Pre_fetched_HMB + in_flight_HMB);
```

```
// Priority 1: Start with command fetching which is the most critical to have enough.
if (CMD_lack > 0) begin
    max_cmd_to_fetch = int (CMD_lack / Write_command_ratio);
    if (max_cmd_to_fetch > max_pending_commands) max_cmd_to_fetch = max_pending_commands;
    fetch max_cmd_to_fetch;
end
if (time_slot_over) restart;

// Priority 2: Fetch relevant PRPs
if (PRP_lack > 0) begin
    max_prp_to_fetch = int (PRP_lack / HPS);
    fetch max_prp_to_fetch;
end
if (time_slot_over) restart;

// Priority 3: Fetch relevant controls
if (HMB_lack > 0) begin
    max_hmb_to_fetch = int (HMB_lack / 4K);
    fetch max_hmb_to_fetch;
end
if (time_slot_over) restart;
```

```
// No specific Priority, do time sharing...
Time slot to allocate = 250uSec - time spent already.
Repeat until all time slot is allocated:
    if (in_flight_PRP <= in_flight_HMB && in_flight_PRP <= in_flight_data)
        allocate time for fetch one PRP;
    if (in_flight_HMB <= in_flight_PRP && in_flight_HMB <= in_flight_data)
        allocate time for one HMB fetching;
    else
        allocate time for 4k data fetching.
Fetch all allocated HMB, PRP and data.
```

FIG. 5

MAXIMIZING PERFORMANCE THROUGH TRAFFIC BALANCING

BACKGROUND OF THE DISCLOSURE

Field of the Disclosure

Embodiments of the present disclosure generally relate to data storage devices, such as solid state drives (SSDs), and, more specifically, balancing interface bandwidth usage.

Description of the Related Art

Non-volatile memory (NVM) express (NVMe) SSDs are coupled to a host device via an interface. The interface is used to satisfy a respective protocol, while trying to reach maximum performance. For example, if the interface is a Peripheral Component Interconnect Express (PCIe) interface, the interface is used to satisfy the PCIe protocol. In order to service commands generated by the host device and sent to the SSD, the SSD uses the interface to fetch, in a non-limiting list, read commands, read pointers, read data, and read mapping tables.

The time between fetching the commands, pointers, data, and tables and when the relevant commands, pointers, data, and tables return to the SSD is the turnaround time. For example, a turnaround time may be about 1 μs. Because requests may not be aligned with transfers from the host device, a misbalance of fetching may occur, which may decrease the overall performance of the interface. Therefore, because of the additional fetching, the bandwidth usage of the interface may be imbalanced.

Therefore, there is a need in the art for an improved balancing of traffic across an interface of a data storage device.

SUMMARY OF THE DISCLOSURE

The present disclosure generally relates to data storage devices, such as solid state drives (SSDs), and, more specifically, balancing interface bandwidth usage. A data storage device includes a memory device and a controller coupled to the memory device. The controller is configured to receive a plurality of fetch requests, determine a first number of requests, second number of requests, and a third number of requests of the plurality of fetch requests, and balance an execution of the first number of requests, the second number of requests, and the third number of requests so that a first ratio of the data requests to the PRP requests and a second ratio of the data requests to the HMB requests is about 1. The plurality of fetch requests includes PRP requests, HMB requests, and data requests. The first number of requests corresponds to a number of the PRP requests. The second number of requests corresponds to a number of the HMB requests. The third number of requests corresponds to a number of the data requests.

In one embodiment, a data storage device includes a memory device and a controller coupled to the memory device. The controller is configured to receive a plurality of fetch requests, where the plurality of fetch requests comprises PRP requests, HMB requests, and data requests, determine a first number of requests of the plurality of fetch requests, where the first number of requests corresponds to a number of the PRP requests, determine a second number of requests of the plurality of fetch requests, where the second number of requests corresponds to a number of the HMB requests, determine a third number of requests of the plurality of fetch requests, where the third number of requests corresponds to a number of the data requests, and balance an execution of the first number of requests, the second number of requests, and the third number of requests so that a first ratio of the data requests to the PRP requests and a second ratio of the data requests to the HMB requests is about 1.

In another embodiment, a data storage device includes a memory device and a controller coupled to the memory device. The controller is configured to initialize a plurality of variables, where the plurality of variables comprises command variables, PRP variables, and HMB variables, where the command variables corresponds to a number of command requests, the PRP variables corresponds to a number of PRP requests, and the HMB variables correspond to a number of HMB requests, set a priority between the command variables, the PRP variables, and the HMB variables, where the priority corresponds to an order of fetching of command requests, PRP requests, and HMB requests, and fetch the command requests, PRP requests, and HMB requests based on the priority to achieve a first ratio of the data requests to the PRP requests and/or a second ratio of the data requests to the HMB requests, and where the first ratio and the second ratio are each equal to about 1.

In another embodiment, a data storage device includes memory means and a controller coupled to the memory means. The controller is configured to receive a plurality of requests to process data, calculate a first ratio based on a type of request of the plurality of requests, where the first ratio of the data requests to the PRP requests and/or the second ratio of the data requests to the HMB requests, and execute a request of the plurality of requests based on the type of request to maintain the first ratio and the second ratio, where the first ratio and the second ratio are each equal to about 1.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, balancing interface bandwidth usage. A data storage device includes a memory device and a controller coupled to the memory device. The controller is configured to receive a plurality of fetch requests, determine a first number of requests, second number of requests, and a third number of requests of the plurality of fetch requests, and balance an execution of the first number of requests, the second number of requests, and the third number of requests so that a first ratio of the data requests to the PRP requests and a second ratio of the data requests to the HMB requests is about 1. The plurality of fetch requests includes PRP requests, HMB requests, and data requests. The first number of requests corresponds to a number of the PRP requests. The second number of requests corresponds to a number of the HMB requests. The third number of requests corresponds to a number of the data requests.

Figure 1:
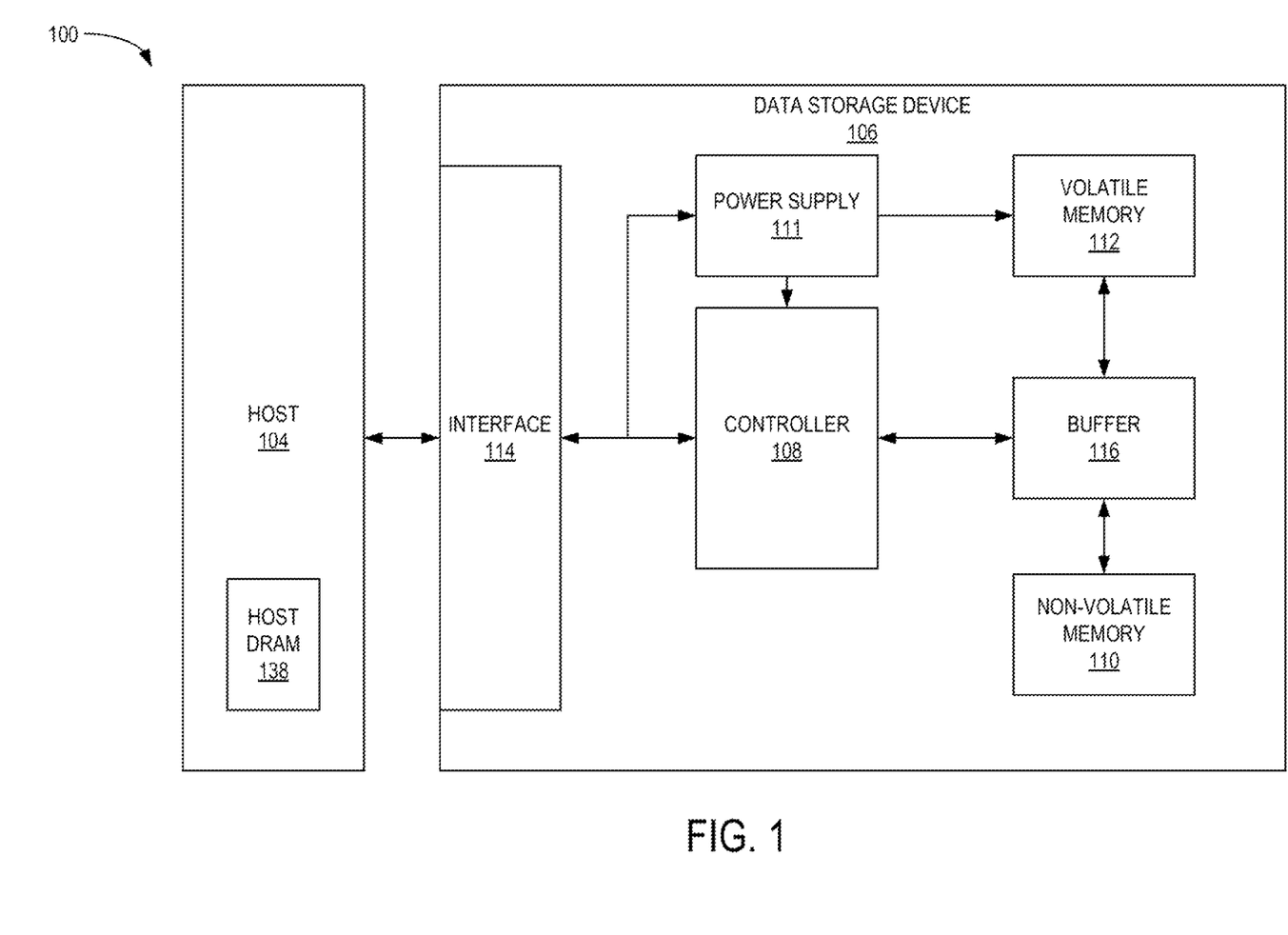
FIG. 1 is a schematic block diagram illustrating a storage system, in which a data storage device may function as a storage device for a host device, according to certain embodiments.

FIG. 1 is a schematic block diagram illustrating a storage system 100, in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storages devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
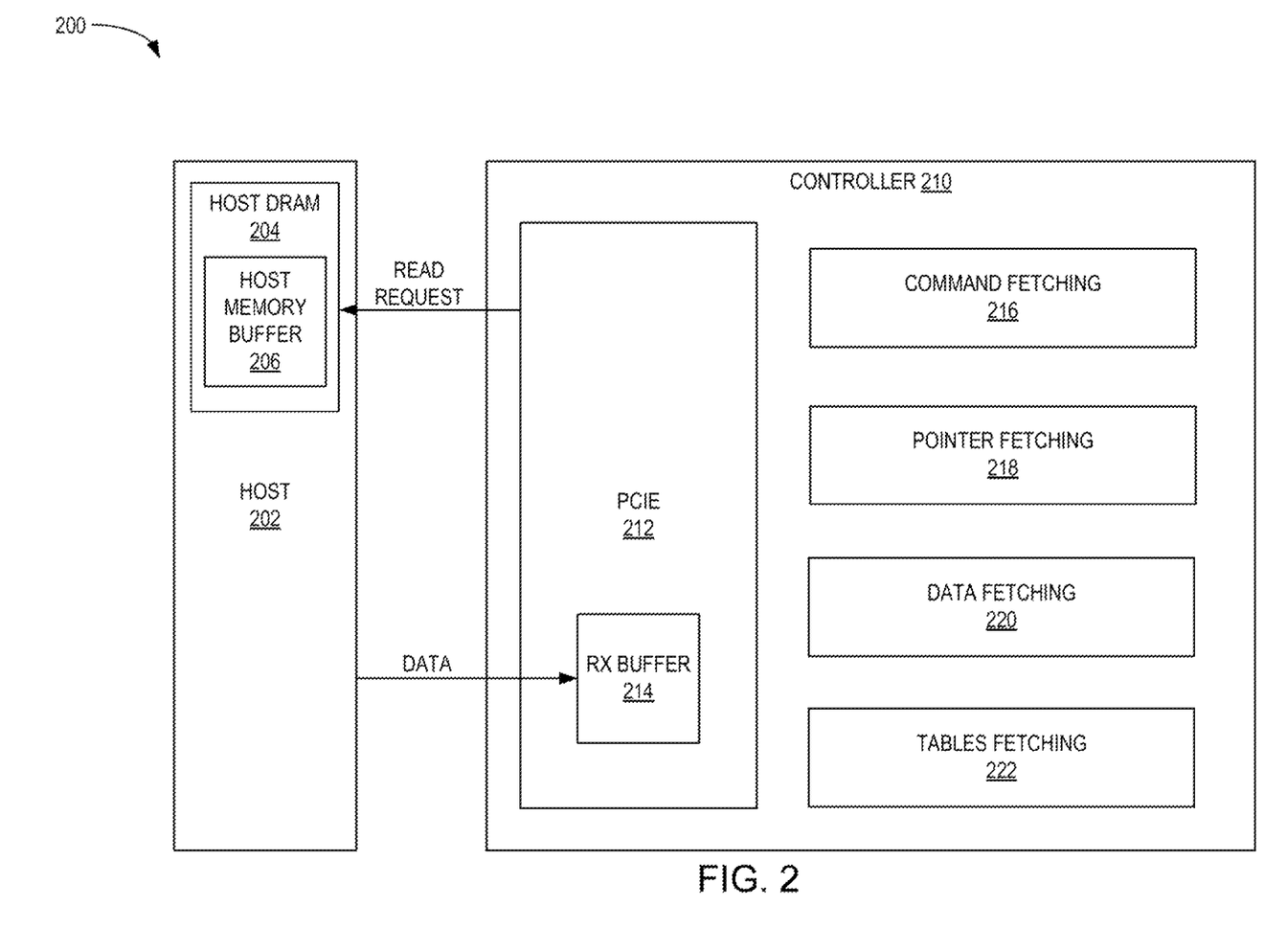
FIG. 2 is a schematic block diagram illustrating a storage system that includes a controller of a data storage device interacting with a host device, according to certain embodiments.

FIG. 2 is a schematic block diagram illustrating a storage system 200 that includes a controller 210 of a data storage device, such as the data storage device 106 of FIG. 1, interacting with a host device 202, which may be the host device 104 of FIG. 1, according to certain embodiments. The controller 210 may be the controller 108 of FIG. 1. It is to be understood that the controller 210 may include additional components not shown for simplification purposes.

The host device 202 includes a host DRAM 204, which may be the host DRAM 138 of FIG. 1. The host DRAM 204 includes a host memory buffer (HMB) 206. The HMB 206 is an allocated portion of the host DRAM 204 that is allocated by the host device 202 for use by the controller 210. The controller 210 may be able to use the HMB 206 without host device 202 interaction, such that the HMB 206 may be considered an extension of a DRAM of the controller 210. Thus, the controller 210 may store data, control information, and the like, which may be generally stored in the DRAM, in the HMB 206 and read data stored from the HMB 206.

The controller 210 includes a PCIe bus 212, a command fetching unit 216, a pointer fetching unit 218, a data fetching unit 220, and a tables fetching unit 222. The controller 210 may utilize the command fetching unit 216 to fetch commands generated by the host device 202, which may be stored in the host DRAM 204 or another relevant storage location, the pointer fetching unit 218 to retrieve pointers stored in the host DRAM 204 or another relevant storage location, the data fetching unit 220 to fetch data stored in the host DRAM 204 or another relevant storage location, and the tables fetching unit 222 to retrieve tables stored in the HMB or another relevant storage location. The PCIe bus 212 includes a RX buffer 214. The RX buffer 214 may be sized based on a turnaround time (e.g., the time from when a request is sent to the host device 202 and when data associated with the request is returned to the controller 210) and a speed (e.g., PCIe bus 212 latency, processor speed, and the like) of the data storage device 106. The PCIe bus 212 latency may be the host device 202 read request response time.

When a read request is sent from the PCIe bus 212, where the read request may be generated by a different component of the controller 210, such as a processor, to the host device 202, the host device 202 may attempt to access the host DRAM 204 to retrieve the request data. Accessing the host DRAM 204 and traversing through the relevant command/data paths may cause a large turnaround time.

Figure 3:
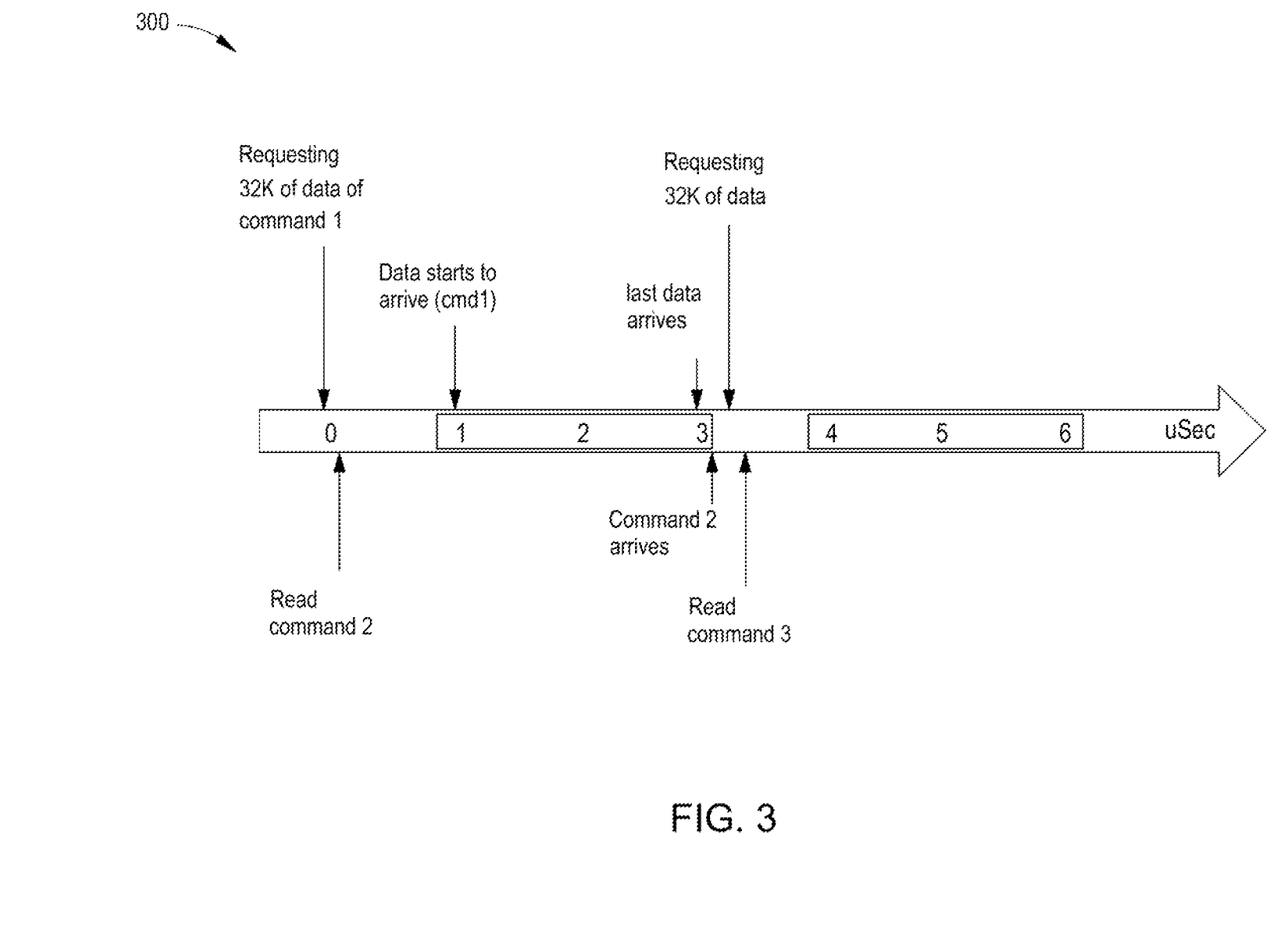
FIG. 3 is an exemplary illustration of misbalanced traffic over an interface, according to certain embodiments.

FIG. 3 is an exemplary illustration of misbalanced traffic over an interface, such as the PCIe bus 212 of the controller 210 of FIG. 2, according to certain embodiments. Aspects of the storage system 200 may be referenced herein for exemplary purposes. Data, commands, and pointers may be requested and fetched from the host device 202 by the controller 210. Likewise, tables, such as logical to physical (L2P) tables may be retrieved from the HMB 206. Furthermore, in a non-limiting example, the turnaround time may be 1 μs.

Commands sent by the host device 202 to the controller 210 may have a granularity, in a non-limiting example, of about 512 MB or about 4 KB and may include data pointers. Each data pointer may point to a host page size (HPS) worth of data. Random commands are commands that have a size up to the HPS. Therefore, for a random write, the controller 210 may not be required to fetch additional physical region page (PRP) pointers (e.g., data pointers) because the entire data range may be described in the command structure itself. Sequential commands may require additional fetching of data pointers as the data range exceeds the HPS. Furthermore, when data pointers are not aligned with a boundary of the data pointer granularity (e.g., about 512 MB or about 4 KB), the controller 210 may issue read requests in a manner to align the data pointers to the boundaries of the data point granularity. For example, for a command of 4 KB, a starting at offset of 512 MB, and a MRRS of 1 KB, the controller 210 may issue the following read requests: Tr #1: 512 MB-1 KB, Tr #2: 1 KB-2 KB, Tr #3: 2 KB-3 KB, Tr #4: 3 KB-4 KB, and Tr #5: 4 KB-4.5 KB. Therefore, each read request is aligned with a boundary of the data pointer granularity. Time slicing is the time for 4 KB worth of data to be transferred over the PCIe bus 212. For example, transferring 4 KB over the PCIe bus 212 may take 250 ns.

Before time 0 μs, the controller 210 has a write command (received from the host device 202) (e.g., command 1) with a size of 32 KB. In order to program the data to a target memory device, such as the NVM 110 of FIG. 1, the controller 210 needs to read the data from the host device 202. In other words, for each write request received by the controller 210, the controller 210 sends a read request back to the host device 202 for the relevant data. Therefore, the controller 210 requests the 32 KB of data from the host device 202 at time 0 μs. However, there may be a maximum read request size (MRRS). For example, the MRRS may be 1 KB. The MRRS is the maximum number of bytes that the controller 210 may request to fetch in a single read request. Each read request takes up bandwidth of the data transfer bus, where the bus is from the controller 210 to the host device 202 direction. Therefore, the controller 210 may attempt to make the read requests sent to the host device 202 as large as possible. Otherwise, the read requests may slow down the read request path.

Therefore, the 32 KB of data may be requested by the controller 210 as 32 read requests, where each read request is requesting 1 KB of data. Then, the controller 210 tries to fetch the next command (e.g., command 2) shortly after requesting the data associated with command 1. At time 1 μs, the controller 210 receives responses corresponding to the read requests sent to the host device 202 at time 0 μs. At time 3 μs, the controller 108 receives the last data of command 1. Because command 2 was requested after the read requests was sent to the host device 202, command 2 is received after the read requests have been received. Afterwards, the controller 210 sends the relevant read requests associated with command 2 and a read request for command 3 to the host device 202. At time 4 μs, the data associated with command 2 begins to be received by the controller 210 (which may be due to the 1 μs turnaround time).

Between time 3 μs and time 4 μs, there is no transferring of requests or data between the controller 210 and the host device 202. In a balanced system, there may be no downtime between data, command, or request transferring. Furthermore, in order to read data, a controller of the data storage device may need to know where the data resides on the host device, which may require pointer fetching, and know the destination of the data on the memory medium, which may require mapping table fetching. For traffic across the bus to be balanced, a ratio (DATA_PRP_Required_ratio) of an amount of data associated with sent read requests and an amount of PRP ranges (e.g., data pointers) being requested should be equal to about 1 and/or a ratio(DATA_HMB_Required_ratio) of an amount of data associated with sent read requests and an amount of data from the tables stored in the HMB, that satisfies the amount of data of the read requests, should be equal to about 1. For example, an 8 KB read in a time slice, 2 PRPs, each having a size of about 4 KB, may be fetched in the time slice.

Figure 4:
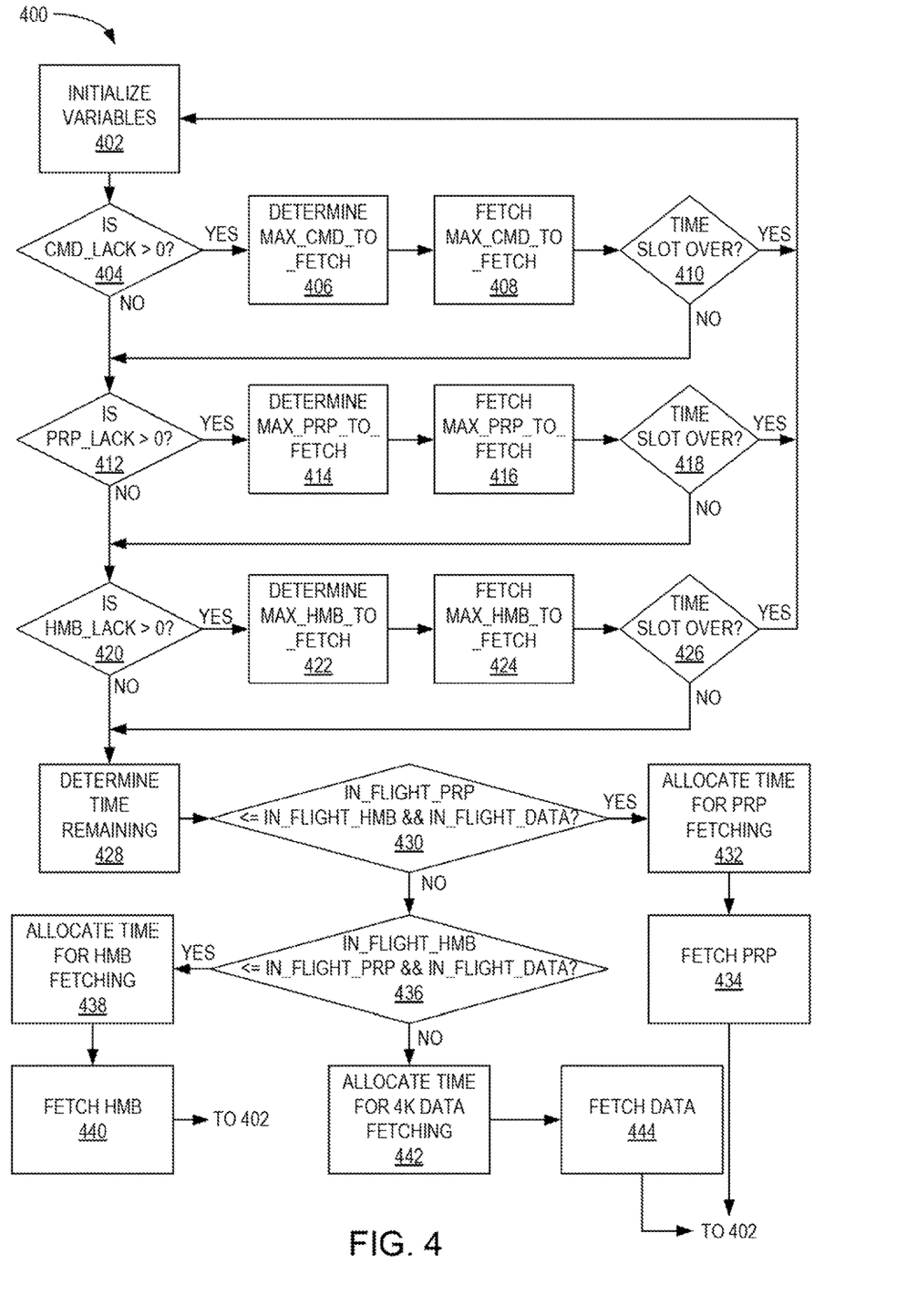
FIG. 4 is a flow diagram illustrating a method of balancing traffic over a data transfer bus between an interface and a host device, according to certain embodiments.

FIG. 4 is a flow diagram illustrating a method 400 of balancing traffic over a data transfer bus between an interface, such as the PCIe bus 212 of the controller 210 of FIG. 2, and a host device, such as the host device 202 of FIG. 2, according to certain embodiments. Aspects of the storage system 200 of FIG. 2 may be referenced herein for exemplary purposes. At block 402, variables associated with method 400 are initialized. The variables includes command variables, PRP variables, and HMB variables.

The command variables includes CMD_lack, In_Flight_Data, Pre_fetched_CMD, Required_write_cmd_pool, and Write_cmd_ratio. The CMD_lack equals Required_write_cmd_pool minus the sum of Pre_fetched_CMD and In_flight_CMD. The In_Flight_CMD variable is increased by the amount of data when the controller 210 issues read requests and decreased by the amount of data provided back to the controller 210 from the read requests. The Pre_fetched_CMD variable is increased by command length when a write command arrives to the controller 210 and decreased by the amount of data being fetched when the controller 210 issues data reads. The Required_write_cmd_pool variable is the amount of data of write commands the controller 210 needs to have to fill a data pipeline. The Write_cmd_ratio variable is a history of how much data associated with write commands (e.g., the host device 202 generated write commands) that was requested for a certain number of command fetches. For example, the number may be 100 commands. The Write_cmd_ratio variable may be dynamically updated because the number of reads and writes may change over time. In other words, the Write_cmd_ratio is equal to the total write data requested for a certain number of commands divided by 100. If the number of fetched commands is less than the certain number, than the total write data for the amount fetched is used.

The PRP variables includes PRP_lack, In_Flight_PRP, Pre_fetched_PRP, and Required_PRP_pool. The PRP_lack equals Required_PRP_pool minus the sum of Pre_fetched_PRP and In_flight_PRP. The In_Flight_CMD variable is increased by the amount of data when the controller 210 issues read requests and decreased by the amount of data provided back to the controller 210 from the read requests. The Pre_fetched_PRP variable is increased by the HPS value when a random write command arrives to the controller 210, increased when the controller 210 gets a response to a PRP fetching request, and decreased by the amount of data being fetched when the controller 210 issues data reads. The Required_PRP_pool variable is the amount of pointersthat the controller 210 expects to hold internally based on the data pipeline. The The HMB variables include HMB_lack, In_Flight_HMB, Pre_fetched_HMB, and Required_HMB_pool. The HMB_lack equals Required_HMB_pool minus the sum of Pre_fetched_HMB and In_flight_HMB. The In_Flight_HMB variable is increased by 4 KB (which may vary based on HMB usage) for each HMB entry read and decreased by 4 KB for each HMB response. The Pre_fetched_HMB variable is increased by 4 KB when the controller 108 receives responses due to HMB fetching and decreased by the amount of data being fetched when the controller 210 issues data reads. The Required_HMB_pool variable is the amount of HMB entries the controller 210 expects to hold internally based on the data pipeline.

The following steps may be based on a priority system. It is contemplated that command fetching has a higher priority than PRP fetching and PRP fetching has higher priority than HMB fetching. Thus, higher priority fetching may take precedent (completed first or requested first) over lower priority fetching.

At block 404, the controller 210 determines if the CMD_lack variable is greater than 0. If the CMD_lack variable is greater than 0 at block 404, then the controller 210 determines the max_cmd_to_fetch at block 406. The max_cmd_to_fetch is equal to the integer value of CMD_lack divided by the Write_cmd_ratio. Furthermore, if the max_cmd_to_fetch value is greater than the max_pending_commands, then the controller 210 sets the max_cmd_to_fetch equal to the max_pending_commands. At block 408, the controller 210 fetches the max_cmd_to_fetch. At block 410, the controller 210 determines if the time slot is over. If the time slot is over at block 410, method 400 returns to block 402.

However, if the time slot is not over at block 410, then the controller 210 determines if the PRP_lack variable is greater than 0 at block 412. If the PRP_lack variable is greater than 0 at block 412, then the controller 210 determines the max_PRP_to_fetch at block 414. The max_PRP_to_fetch is equal to the integer value of PRP_lack divided by the HPS. At block 416, the controller 210 fetches the max_PRP_to_fetch. At block 418, the controller 210 determines if the time slot is over. If the time slot is over at block 418, method 400 returns to block 402.

However, if the time slot is not over at block 418, then the controller 210 determines if the HMB_lack variable is greater than 0 at block 420. If the HMB_lack variable is greater than 0 at block 420, then the controller 210 determines the max_HMB_to_fetch at block 422. The max_PRP_to_fetch is equal to the integer value of PRP_lack divided by 4 KB. At block 424, the controller 210 fetches the max_PRP_to_fetch. At block 426, the controller 210 determines if the time slot is over. If the time slot is over at block 426, method 400 returns to block 402.

The following steps may be based on a time sharing system, such that command fetching, PRP fetching, and HMB fetching share the time remaining in the time slot. The controller 210 may allocate time for command fetching, PRP fetching, and HMB fetching, where the time allocated results in the DATA_PRP_Required_ratio equaling about 1 and DATA_HMB_Required_ratio equaling about 1. It is to be understood that there may be a range of values around 1 for each of the ratios that may be acceptable. Thus, the allocation of time may be based on achieving a ratio of 1 for either ratio or for both ratios.

However, if the time slot is not over at block 426, then the controller 210 determines the time remaining in the time slot at block 428. At block 430, the controller 210 determines if In_Flight_PRP is less than or equal to In_Flight_HMB and if In_Flight_PRP is less than or equal to In_Flight_Data. If the logical statement at block 430 is true, then the controller 210 allocates time for PRP fetching at block 432. At block 434, the controller 210 fetches the PRP pointers. Method 400 returns to block 402.

However, if the logical statement at block 430 is false, then the controller 210 determines if In_Flight_HMB is less than or equal to In_Flight_PRP and if In_Flight_HMB is less than or equal to In_Flight_Data at block 436. If the logical statement at block 436 is true, then the controller 210 allocates time for HMB fetching at block 438. At block 440, the controller 210 fetches the HMB entries. Method 400 returns to block 402.

However, if the logical statement at block 436 is false, then the controller 210 allocates time for 4 KB data fetching at block 442. At block 444, the controller 210 fetches the data in a 4 KB size. Method 400 returns to block 402.

In some examples, the controller 210 may execute the priority system of method 400 without executing the time sharing system of method 400. In other examples the controller 210 may execute the time sharing system of method 400 without executing the priority system of method 400.

Figure 5:
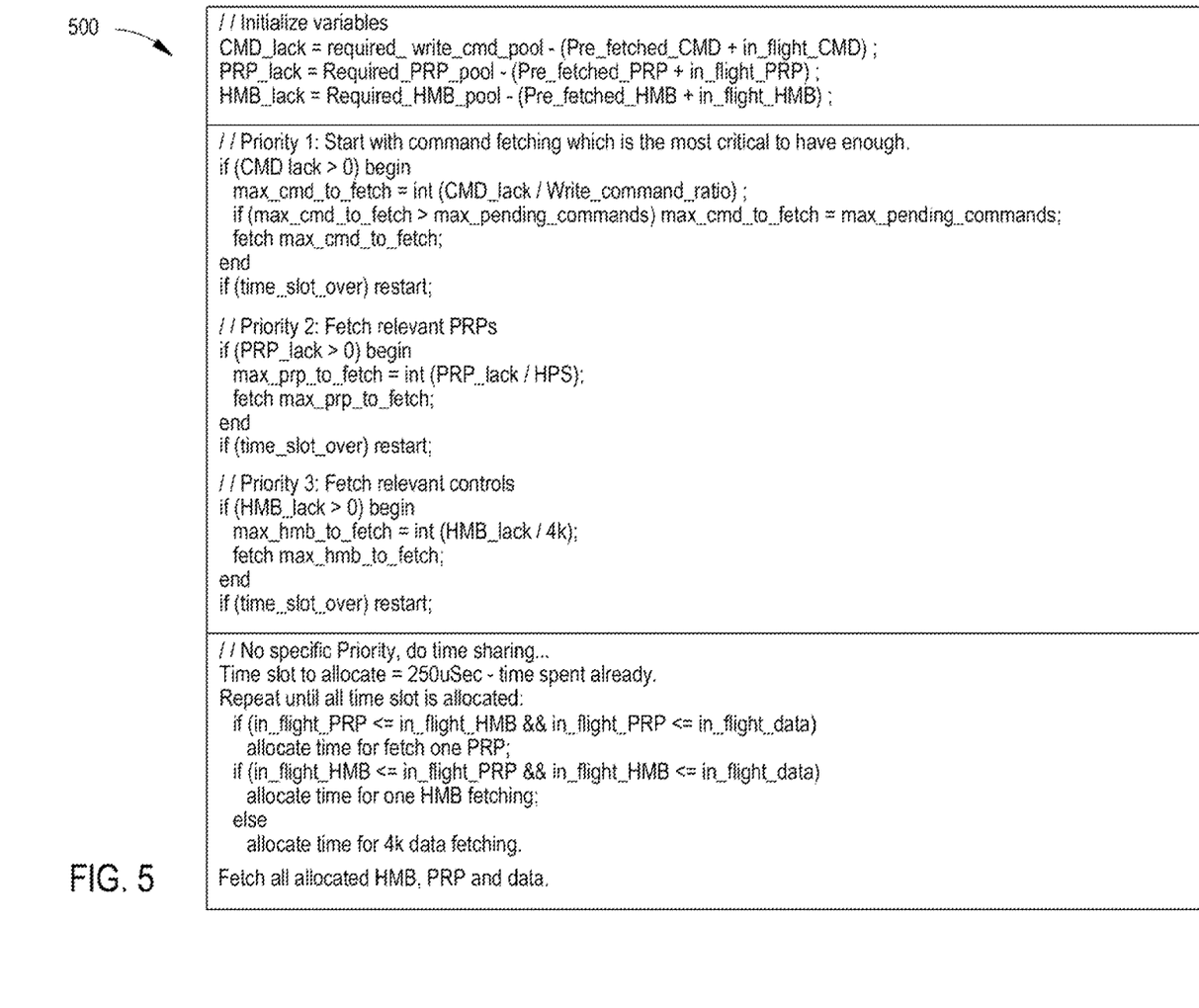
FIG. 5 is an exemplary algorithm showing the method of FIG. 4, according to certain embodiments.

FIG. 5 is an exemplary algorithm 500 showing method 400 of FIG. 4, according to certain embodiments. The exemplary algorithm 500 illustrates an example of balancing traffic over a data transfer bus between an interface, such as the PCIe 212 of the controller 210 of FIG. 2, and a host device, such as the host device 202 of FIG. 2.

In some examples, the data being fetched may be counted by the controller 210. For example, the number of fetch requests in each category (e.g., PRP fetches, HMB fetches, and data fetches) are counted. For HMB fetching and PRP fetching, each read request has a known absolute value. When the traffic over the data transfer bus is mostly random write commands, each read request has a size equal to MRRS divided by 2. When the traffic is mostly sequential write commands, each read request has a size equal MRRS. Thus, the size of the read request is the data_fetch_size. It is to be understood that the term "mostly" may refer to greater than 50%. Furthermore, it is to be understood that the previously listed read request size considerations may be a simplification of an embodiment. In some embodiments, the actual read request size is tracked.

Furthermore, the read request size may further be tuned based on the rate of random write commands and the rate of sequential write commands. Therefore, in each time slot, each data read request may have a size equal to a sum of 4 KB divided by the data_fetch_size, 1 HMB read request, and one PRP read request for each HPS/4 KB time slot. Furthermore, the time slot may be based on the latency of servicing requests by the host device 202. The controller 210 may track the latency of servicing requests by the host device 202. For example, if the latency is 250 ns, then the controller 210 first fetches 4 KB of data and then fetches PRP pointers. The allocation of time for relevant fetching based on remaining time slots allows for balanced traffic over the data transfer bus.

By balancing PRP fetching, command fetching, data fetching, and HMB fetching, the performance of the data storage device may be improved.

In one embodiment, a data storage device includes a memory device and a controller coupled to the memory device. The controller is configured to receive a plurality of fetch requests, where the plurality of fetch requests comprises PRP requests, HMB requests, and data requests, determine a first number of requests of the plurality of fetch requests, where the first number of requests corresponds to a number of the PRP requests, determine a second number of requests of the plurality of fetch requests, where the second number of requests corresponds to a number of the HMB requests, determine a third number of requests of the plurality of fetch requests, where the third number of requests corresponds to a number of the data requests, and balance an execution of the first number of requests, the second number of requests, and the third number of requests so that a first ratio of the data requests to the PRP requests and a second ratio of the data requests to the HMB requests is about 1.

Each read request of a plurality of read requests corresponding to a fetch request of the plurality of fetch requests has a size equal to a maximum read request size (MRRS). Greater than 50% of the plurality of read requests are sequential write requests. Each read request of a plurality of read requests corresponding to a fetch request of the plurality of fetch requests has a size equal to a maximum read request size (MRRS)/2. Greater than 50% of the plurality of read requests are random write requests. Each time slot includes a 4 KB data transmission divided by a data fetch size. The data fetch size corresponds to either a maximum read request size (MRRS) or a MRRS/2. The controller is further configured to track latency for each fetch request to be serviced by a host device. The controller is further configured to set a time slot based on the tracked latency. The time slot includes 4 KB divided by a data fetch size for the plurality of read requests, a HMB request of the plurality of HMB requests, and a PRP request for each host page size (HPS) divided by a data fetch size for the plurality of PRP requests. The time slot is dynamic.

In another embodiment, a data storage device includes a memory device and a controller coupled to the memory device. The controller is configured to initialize a plurality of variables, where the plurality of variables comprises command variables, PRP variables, and HMB variables, where the command variables corresponds to a number of command requests, the PRP variables corresponds to a number of PRP requests, and the HMB variables correspond to a number of HMB requests, set a priority between the command variables, the PRP variables, and the HMB variables, where the priority corresponds to an order of fetching of command requests, PRP requests, and HMB requests, and fetch the command requests, PRP requests, and HMB requests based on the priority to achieve a first ratio of the data requests to the PRP requests and/or a second ratio of the data requests to the HMB requests, and where the first ratio and the second ratio are each equal to about 1.

The command variables includes a CMD_lack variable. The CMD_lack variable corresponds to a number of write commands to fill a data pipeline minus a sum of a number of prefetched write commands and a number of write commands being read. The PRP variables comprises a PRP_lack variable. The PRP_lack variable corresponds to an amount of pointers expected to be held in the controller based on the data pipeline minus a sum of a number of prefetched PRPs and a number of PRPs being read. The HMB variables includes a HMB_lack variable. The HMB_lack variable corresponds to an amount of HMB entries expected to be held in the controller based on the data pipeline minus a sum of a number of prefetched HMB entries and a number of HMB entries being read. The command variables are associated with a first priority. The PRP variables are associated with a second priority. The first priority is greater than the second priority. The HMB variables are associated with a third priority. The second priority is greater than the third priority. The command variables, the PRP variables, and the HMB variables are associated with same priority.

In another embodiment, a data storage device includes memory means and a controller coupled to the memory means. The controller is configured to receive a plurality of requests to process data, calculate a first ratio based on a type of request of the plurality of requests, where the first ratio of the data requests to the PRP requests and/or the second ratio of the data requests to the HMB requests, and execute a request of the plurality of requests based on the type of request to maintain the first ratio and the second ratio, where the first ratio and the second ratio are each equal to about 1.

The executing occurs in time slots. The time slots are adjustable based on latency and type of request.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, the controller configured to:
   receive a plurality of fetch requests, wherein the plurality of fetch requests comprises Physical Region Page (PRP) requests, Host Memory Buffer (HMB) requests, and data requests;
   determine a first number of requests of the plurality of fetch requests, wherein the first number of requests corresponds to a number of the PRP requests;
   determine a second number of requests of the plurality of fetch requests, wherein the second number of requests corresponds to a number of the HMB requests;
   determine a third number of requests of the plurality of fetch requests, wherein the third number of requests corresponds to a number of the data requests; and
   balance an execution of the first number of requests, the second number of requests, and the third number of requests so that a first ratio of the data requests to the PRP requests and a second ratio of the data requests to the HMB requests is about 1.

2. The data storage device of claim 1, wherein each read request of a plurality of read requests corresponding to a fetch request of the plurality of fetch requests has a size equal to a maximum read request size (MRRS).

3. The data storage device of claim 2, wherein greater than 50% of the plurality of read requests are sequential write requests.

4. The data storage device of claim 1, wherein each read request of a plurality of read requests corresponding to a fetch request of the plurality of fetch requests has a size equal to a maximum read request size (MRRS)/2.

5. The data storage device of claim 4, wherein greater than 50% of the plurality of read requests are random write requests.

6. The data storage device of claim 1, wherein each time slot comprises a 4 KB data transmission divided by a data fetch size, and wherein the data fetch size corresponds to either a maximum read request size (MRRS) or a MRRS/2.

7. The data storage device of claim 1, wherein the controller is further configured to track latency for each fetch request to be serviced by a host device.

8. The data storage device of claim 7, wherein the controller is further configured to set a time slot based on the tracked latency.

9. The data storage device of claim 8, wherein the time slot comprises 4 KB divided by a data fetch size for the plurality of read requests, a HMB request of the plurality of HMB requests, and a PRP request for each host page size (HPS) divided by a data fetch size for the plurality of PRP requests.

10. The data storage device of claim 8, wherein the time slot is dynamic.

11. A data storage device, comprising:
a memory device; and
a controller coupled to the memory device, the controller configured to:
  initialize a plurality of variables, wherein the plurality of variables comprises command variables, Physical Region Page (PRP) variables, Host Memory Buffer (HMB) variables, wherein:
    the command variables corresponds to a number of command requests;
    the PRP variables corresponds to a number of PRP requests; and
    the HMB variables correspond to a number of HMB requests;
  set a priority between the command variables, the PRP variables, and the HMB variables, wherein the priority corresponds to an order of fetching of command requests, PRP requests, and HMB requests; and
  fetch the command requests, PRP requests, and HMB requests based on the priority to achieve a first ratio of the data requests to the PRP requests and/or a second ratio of the data requests to the HMB requests, and wherein the first ratio and the second ratio are each equal to about 1.

12. The data storage device of claim 11, wherein the command variables comprises a CMD_lack variable, and wherein the CMD_lack variable corresponds to a number of write commands to fill a data pipeline minus a sum of a number of prefetched write commands and a number of write commands being read.

13. The data storage device of claim 11, wherein the PRP variables comprises a PRP_lack variable, and wherein the PRP_lack variable corresponds to an amount of pointers expected to be held in the controller based on the data pipeline minus a sum of a number of prefetched PRPs and a number of PRPs being read.

14. The data storage device of claim 11, wherein the HMB variables comprises a HMB_lack variable, and wherein the HMB_lack variable corresponds to an amount of HMB entries expected to be held in the controller based on the data pipeline minus a sum of a number of prefetched HMB entries and a number of HMB entries being read.

15. The data storage device of claim 11, wherein the command variables are associated with a first priority.

16. The data storage device of claim 15, wherein the PRP variables are associated with a second priority, and wherein the first priority is greater than the second priority.

17. The data storage device of claim 16, wherein the HMB variables are associated with a third priority, and wherein the second priority is greater than the third priority.

18. The data storage device of claim 11, wherein the command variables, the PRP variables, and the HMB variables are associated with same priority.

19. A data storage device, comprising:
memory means; and
a controller coupled to the memory means, the controller configured to:
  receive a plurality of requests to process data;
  calculate a first ratio based on a type of request of the plurality of requests, wherein the first ratio of the data requests to the Physical Region Page (PRP) requests and/or the second ratio of the data requests to the Host Memory Buffer (HMB) requests; and
  execute a request of the plurality of requests based on the type of request to maintain the first ratio and the second ratio, wherein the first ratio and the second ratio are each equal to about 1.

20. The data storage device of claim 19, wherein the executing occurs in time slots, and wherein the time slots are adjustable based on latency and type of request.

* * * * *